United States Patent [19]

Van de Sande et al.

[11] Patent Number: 4,748,108

[45] Date of Patent: May 31, 1988

[54] YELLOW DYE-RELEASING AZO COMPOUNDS FOR USE IN THE PRODUCTION OF DIFFUSION TRANSFER COLOR IMAGES

[75] Inventors: Christian C. Van de Sande, Belsele; Piet Kok, Ghent, both of Belgium

[73] Assignee: AGFA-Gevaert, N.V., Mortsel, Belgium

[21] Appl. No.: 883,117

[22] Filed: Jul. 8, 1986

[30] Foreign Application Priority Data

Jul. 9, 1985 [EP] European Pat. Off. ........ 85201126.1

[51] Int. Cl.$^4$ .......................... G03C 5/54; G03C 7/26
[52] U.S. Cl. ..................................... 430/562; 430/223
[58] Field of Search ........................ 430/223, 562, 242

[56] References Cited

U.S. PATENT DOCUMENTS

| | | | |
|---|---|---|---|
| 3,443,940 | 5/1969 | Bloom et al. | 430/223 |
| 4,245,028 | 1/1981 | Fujita et al. | 430/223 |
| 4,367,278 | 1/1983 | Harada et al. | 430/223 |
| 4,371,604 | 2/1983 | Van de Sande et al. | 430/223 |
| 4,477,554 | 10/1984 | Van de Sande et al. | 430/223 |
| 4,605,613 | 8/1986 | Van de Sande et al. | 430/223 |
| 4,663,273 | 5/1987 | Van de Sande et al. | 430/223 |

Primary Examiner—Richard L. Schilling
Attorney, Agent, or Firm—A. W. Breiner

[57] ABSTRACT

In a dye diffusion transfer process the use of a photosensitive element incorporating hydroquinone-type or quinone-type redox-controlled yellow dye-releasing azo compounds containing in the releasable dye moiety a pyrazolone group carrying alkyl, aryl, aralkyl, hetaryl, or heterocyclyl on the 1-position and acylamido, alkylureido, cycloalkylureido, or arylureido on the 3-position, for improved color reproduction of the dye diffusion transfer image as a result of development and a redox-reaction. The invention also provides photosensitive elements incorporating such dye-releasing compounds.

6 Claims, No Drawings

YELLOW DYE-RELEASING AZO COMPOUNDS FOR USE IN THE PRODUCTION OF DIFFUSION TRANSFER COLOR IMAGES

DESCRIPTION

The present invention relates to a process for the production of diffusion transfer images with yellow dye-releasing non-diffusible compounds and to photosensitive elements incorporating them.

Dye diffusion transfer imaging can be carried out in a number of ways but all dye diffusion transfer imaging systems are based on the same principle of modifying the solubility of the dyes as a function of the amount of photographic silver halide developed.

In commonly known dye diffusion transfer processes the dye-image-producing compounds are either initially mobile in alkaline aqueous media and become immobilized during processing, or initially immobile and become mobilized during processing.

A survey of such processes has been given by Christian C. Van de Sande in Angew. Chem.- Int. Ed. Engl. 22 (1983) N°. 3, 191–209.

Four important categories of dye-release processes are based on the following reactions respectively:
(A) a redox-reaction controlling a solubility change;
(B) an oxidative chromogenic coupling reaction;
(C) a redox-controlled cleavage reaction;
(D) an argentolytic cleavage reaction of a dye-releasing compound with silver ions.

A dye-developer system based on redox-controlled solubility change (ref. e.g. U.S. Pat. No. 2,983,606) was the first commercially introduced dye diffusion transfer system.

Later on redox-controlled dye-releasing compounds were introduced in commercial systems.

Oxidizable dye-releasing compounds that after oxidation release a dye moiety by hydrolysis are known, e.g., from DE-A No. 2,242,762, DE-A No. 2,406,664, DE-A No. 2,505,246 DE-A No. 2,613,005, DE-A No. 2,645,656 and Research Disclosure publications Nos. 15,157 (November 1976), 16,654 (April 1977) and 17,736 (January 1979). In these references dye-releasing compounds are described in which the dye moiety is linked most frequently to an oxidizable carrier moiety through a sulphonamido group. The dye released from such compounds thus contains a sulphamoyl group.

Oxidizable dye-releasing compounds that in oxidized form release a dye moiety by intramolecular displacement reaction are described, e.g., in U.S. Pat. No. 3,443,940. The dye released from these compounds contains a sulphinate group.

In is particularly interesting in dye diffusion transfer to operate with dye-releasing compounds, the dye release of which is inversely proportional to the development of a negative-working silver halide emulsion layer so that positive dye images can be formed in an image-receiving layer.

Oxidizable dye-releasing compounds that in oxidized form are stable but in reduced state set free a dye moiety by an elimination reaction are described in DE-A No. 2,823,159 and DE-A No. 2,854,946. Compounds of this type can be used in reduced form in an unexposed silver halide emulsion material and can be called IHO-compounds, IHO being an acronym for "Inhibited Hydrolysis by Oxidation".

Reducible dye-releasing compounds that after reduction set free a dye moiety can be called IHR-compounds, IHR standing for "Increased Hydrolysis by Reduction".

Reducible quinonoid IHR-compounds, which after reduction can undergo a dye release with an intramolecular nucleophilic displacement reaction, are described in DE-A No. 2,809,716 wherein these compounds are called BEND-compounds, BEND standing for "Ballasted Electron-accepting Nucleophilic Displacement".

Reducible IHR-compounds, which after reduction can undergo a dye release with an elimination reaction are described in published EP-A No. 0,004,399 and in U.S. Pat. No. 4,371,604.

Other classes of compounds that may release a dye after reduction are described in DE-A No. 3,008,588 and DE-A No. 3,014,669.

Particularly useful dye-releasing compounds are the redox-controlled dye-releasing compounds, which can be represented by:

BALL-REDOX-DYE wherein:
BALL represents a moiety with ballast residue for immobilizing the dye-releasing compound in a hydrophilic colloid layer,
REDOX represents a redox-active group, i.e. a group that under the circumstances of alkaline silver halide development is oxidizable or reducible and depending on the oxidized or reduced state brings about a dye release by an elimination reaction, nucleophilic displacement reaction, hydrolysis, or cleavage reaction,
DYE represents a diffusible dye moiety or a precursor thereof.

Redox-controlled yellow dye-releasing compounds of the hydroquinone-type or quinone-type used sofar in the blue-sensitive silver halide layer of a photosensitive element in dye diffusion transfer imaging systems have a high intrinsic absorption in the blue region of the visible spectrum. In general, they have an absorption maximum ($\lambda$ max) above 400 nm.

The high intrinsic absorption of these redox-controlled hydroquinone-type or quinone-type dye-releasing compounds in the blue-sensitive layer regretfully leads to a significant loss in speed of the latter layer.

There consequently is a need to provide a redox-controlled hydroquinone-type or quinone-type dye-releasing compounds, which when incorporated in non-diffusing state into the blue-sensitive layer of a photosensitive element do not substantially reduce its speed.

It is therefore an object of the present invention to provide photosensitive elements incorporating hydroquinone-type or quinone-type redox-controlled dye-releasing compounds, which in non-diffusing state have an absorption maximum shifted hypsochromically as compared with that of the known redox-controlled dye-releasing compounds, i.e. they have an absorption maximum lower than 400 nm, preferably even lower than 390 nm and which upon redox reaction during alkaline silver halide development release yellow dyes having good diffusibility towards an image-receiving layer and after having been mordanted therein have an appropriate absorption maximum and an appropriate absorption spectrum, such yellow dyes also having satisfactory dark-fading stability and stability to heat, light, and moisture.

It is also an object of the present invention to provide a process for the production of diffusion transfer colour images by means of photosensitive elements incorporating hydroquinone-type or quinone-type dye-releasing compounds having an absorption maximum lower than 400 nm.

According to the present invention there is provided a photosensitive element incorporating in operative association with at least one alkali-permeable silver halide hydrophilic colloid emulsion layer at least one hydroquinone-type or quinone-type redox-controlled dye-releasing compound in ballasted non-diffusing state that can split off image-wise a diffusible yellow azo-pyrazolone dye as a function of development of said silver halide emulsion layer and of a redox reaction characterized in that said dye-releasing compound corresponds to one of the following general formulae I and II:

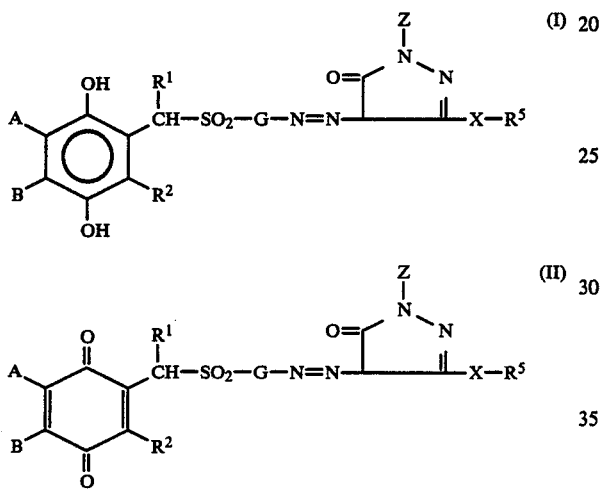

wherein:
each of A and B (the same or different) represents:
a monoatomic group e.g. hydrogen or a halogen atom, or a polyatomic group e.g. an alkyl group such as methyl, an alkoxy group, or an acylamino group, the acyl group of which is derived from an aliphatic or aromatic carboxylic or sulphonic acid,
or A and B together represent the atoms needed to complete a carbocyclic ring, which may be saturated or unsaturated,
each of $R^1$ and $R^2$ (the same or differnt) represents:
hydrogen, an alkyl group e.g. methyl, a substituted alkyl group, an aromatic group e.g. a phenyl group, or a substituted aromatic group e.g. an alkoxyphenyl group, at least one of $R^1$ and $R^2$ representing or including a ballasting group of sufficient size to render said dye-releasing compound non-diffusing in an alkali-permeable hydrophilic colloid layer under wet alkaline conditions,
G represents a bivalent organic group (which can be substituted or unsubstituted) containing at least one homocyclic or heterocyclic aromatic nucleus e.g. one phenylene group or substituted phenylene group or two or three phenylene groups or substituted phenylene groups that are linked to each other by a bivalent atom such as e.g. —O— or —S— or by a bridging group such as e.g. —$SO_2$—, —$N(R^3)$—, —$SO_2$—$N(R^3)$—, —$N(R^3)$—$SO_2$—, —$N(R^3)$—$SO_2$—$N(R^4)$—, —$N(R^3)$—CO—, —CO—$N(R^3)$—, —$N(R^3)$—CO—$N(R^4)$—, —$(CH_2)_p$—, —$(C_6H_4)_q$—, —$(CH_2)_r$—Q—$(CH_2)_s$—, or —$(C_6H_4)_t$—Q—$(C_6H_4)_v$—, wherein:
each of $R^3$ and $R^4$ (same or different) represents hydrogen, a $C_1$–$C_4$ alkyl group e.g. methyl, or an aryl group e.g. phenyl,
Q represents a bivalent atom such as —O— or —S—, and
each of p, q, r, s, t, and v may represent a positive integer from 1 to 5;
Z represents an alkyl group, a substituted alkyl group e.g. 2,2,2-trifluoroethyl, an aryl group e.g. phenyl, a substituted aryl group e.g. p-nitrophenyl, 2,4,6-trichlorophenyl, 2-(1,1,2-trifluoro-2-chloro-ethoxy)phenyl, or methylsulphonylphenyl, an aralkyl group e.g. benzyl, a substituted aralkyl group, a hetaryl group, a substituted hetaryl group, a heterocyclyl group, or a substituted heterocyclyl group, which heterocyclyl group or substituted heterocyclyl group may be saturated or unsaturated.
$R^5$ represents hydrogen, an alkyl group e.g. methyl or butyl, a substituted alkyl group, an aryl group e.g. phenyl, a substituted aryl group, a hetaryl group, a substituted hetaryl group, an acyl group e.g. acetyl, pivaloyl, or benzoyl, a substituted acyl group, an alkylsulphonyl group e.g. methylsulphonyl, a substituted alkylsulphonyl group, an arylsulphonyl group e.g. benzenesulphonyl, a substituted arylsulphonyl group e.g. p-acetamidobenzenesulphonyl, $R^7R^8$NCO—, $R^7R^8$N$SO_2$—, $R^7$OCO—, or $R^7$O$SO_2$—, $R^7$ and $R^8$ being identical or different and each of them representing hydrogen, an alkyl group e.g. butyl or cyclohexyl, a substituted alkyl group, an aryl group e.g. phenyl, a substituted aryl group e.g. p-cyanophenyl, a hetaryl group, or a substituted hetaryl group, or $R^7$ and $R^8$ together constituting the ring members completing a heterocyclic nucleus,
X is a bivalent mono- or polyatomic group having at least one free electron pair e.g. —O—, —S—, or —$N(R^6)$—, wherein $R^6$ has one of the above possible meanings of $R^5$, such group —$N(R^6)$— being independent of $R^5$ or forming together with $R^5$ the atoms needed to complete a heterocyclic nucleus e.g. 1-pyrrolidinyl, in which latter case $R^5$ and $R^6$ may be the same or different.

Examples of substituents that can be carried by the bivalent organic group represented by G are alkyl, aryl, alkoxy, aryloxy, —$NR^9R^{10}$, a halogen atom, $R^9$—S—, $R^9$—$SO_2$—, acyl, acyloxy, or hetaryl, wherein each of $R^9$ and $R^{10}$ represents hydrogen, alkyl, aryl, or hetaryl, or $R^9$ and $R^{10}$ together can complete a heterocyclic group. In the case that $R^9$ and $R^{10}$ are both present they can be identical or different.

It is also possible to use in accordance with the present invention hydroquinone-type or quinone-type dye-releasing compounds corresponding to the above general formulae I and II but wherein the moiety —X—$R^5$ is a bivalent bridging group that links with moiety D corresponding to the general formula III:

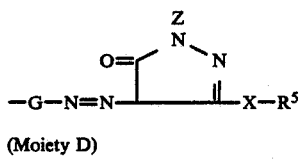

(Moiety D)

It is even possible to link a second moiety D to the —X— $R^5$ group of the first moiety D. Of course, these repeated moieties (two or three) can be identical or different. With respect to dye-releasing compounds comprising repeated moieties there can also be made reference to EP-A No. 0,149,260, which corresponds to the U.S. Ser. No. 06/689,133, now abandoned.

The present invention also provides a process for the production of diffusion transfer colour images comprising the steps of
(1) applying an alkaline aqueous processing liquid to an image-wise exposed photosensitive element that contains in operative association with at least one alkali-permeable silver halide hydrophilic colloid emulsion layer at least one hydroquinone-type or quinone-type dye-releasing compound,
(2) providing a silver halide developing agent, which is present in said photosensitive element at least during application of said alkaline aqueous processing liquid to effect image-wise release of a yellow azo-pyrazolone dye as a function of development of said silver halide emulsion layer and of a redox-reaction, and
(3) allowing diffusion of said released yellow azo-pyrazolone dye into an image-receiving layer that is placed in water-permeable relationship with said emulsion layer,
characterized in that said dye-releasing compound corresponds to one of the above-defined general formulae I and II.

According to a preferred embodiment use is made of a quinone-type dye-releasing IHR-compound incorporating the azo-pyrazolone dye moiety, which is released by reduction and hydrolysis.

The reaction operative in the release of a dye moiety from said quinone-type IHR-compounds proceeds in two stages as illustrated by the following reaction mechanism:

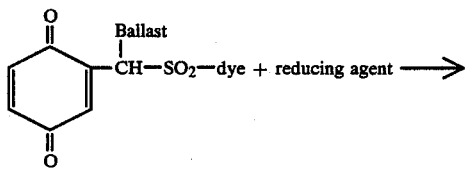

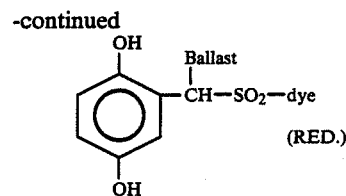

(RED.) + OH⁻ (alkali) ⟶

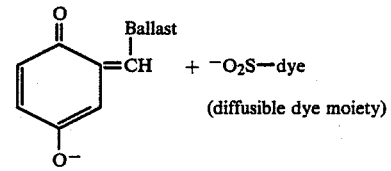

wherein:
"Ballast" stands for a ballasting group making the compound non-diffusing in a hydrophilic colloid medium under wet alkaline conditions.

The term "diffusible" as used herein stands for "having the property of diffusing effectively through colloid layers of the photosensitive elements in alkaline liquid medium". The term "mobile" has the same meaning. The term "non-diffusing" has the opposite meaning.

A very interesting class of redox-controlled yellow dye-releasing compounds for use in the process according to the present invention are the quinone-type IHR-compounds according to the above general formula, in which the nitrogen atom at the 1-position of the pyrazolone nucleus carries an aryl group, a substituted aryl group, or an aralkyl group and the carbon atom at the 3-position of the pyrazolone nucleus carries a substituent, which is an acylamido group, an alkylureido group, a cycloalkylureido group, or an arylureido group. The absorption maximum of the compounds of this preferred class was found to have hypsochromically shifted to 382 nm and even lower. Preferred examples of substituents on the 1-position of the pyrazolone nucleus are phenyl, p-methylsulphonylphenyl, and benzyl, whereas preferred examples of substituents on the 3-position of the pyrazolone nucleus are acetamido, 3-butylureido, 3-phenylureido, and 3-cyclohexylureido.

Examples of yellow dye-releasing compounds for use in accordance with the present invention are listed in the following Table 1. They correspond to the following structural formula IV, the symbol Z used therein having a significance as defined for the above general formulae I and II and the symbol Y standing for X—$R^5$ of the above general formulae I and II:

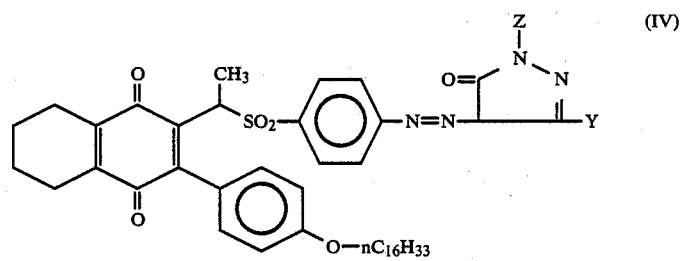

TABLE 1

| Dye-releas. Compound | Z | Y |
|---|---|---|
| 1.01 | phenyl | butylamino |
| 1.02 | phenyl | anilino |
| 1.03 | phenyl | acetamido |
| 1.04 | benzyl | acetamido |

Other examples of yellow dye-releasing compounds for use in accordance with the present invention are listed in the following Table 2. They correspond to the following structural formula V, the symbol Z used therein having a significance as defined for the above general formulae I and II and the symbol Y standing for X—R$^5$ of the above general formulae I and II:

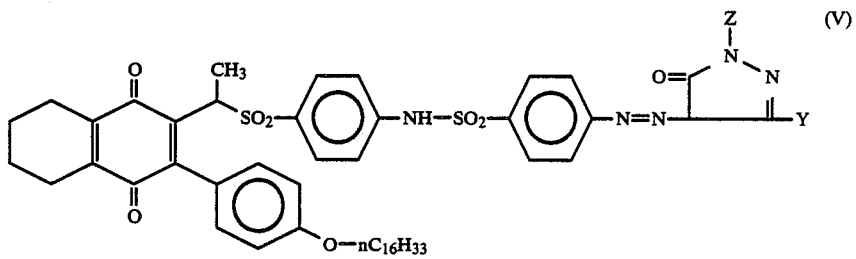

| 1.05 | benzyl | dimethylamino |
| 1.06 | phenyl | benzamido |
| 1.07 | phenyl | 1-pyrrolidinyl |
| 1.08 | p-nitrophenyl | 1-pyrrolidinyl |
| 1.09 | 2,4,6-trichlorophenyl | acetamido |
| 1.10 | benzyl | 3-phenylureido |
| 1.11 | benzyl | 3-cyclohexylureido |
| 1.12 | 2,2,2-trifluoroethyl | acetamido |
| 1.13 | benzyl | benzenesulphonamido |
| 1.14 | benzyl | methanesulphonamido |
| 1.15 | benzyl | benzamido |
| 1.16 | 2-(1,1,2-trifluoro-2-chloro-ethoxy)phenyl | acetamido |
| 1.17 | p-methylsulphonylphenyl | acetamido |
| 1.18 | phenyl | 3-phenylureido |
| 1.19 | benzyl | pivalamido |
| 1.20 | benzyl | amino |
| 1.21 | phenyl | 3-butylureido |
| 1.22 | benzyl | p-acetamidobenzenesulphonamido |
| 1.23 | benzyl | 3-carboxypropionamido |
| 1.24 | benzyl | 3-(p-cyanophenyl)-ureido |
| 1.25 | benzyl | 3-butylureido |
| 1.26 | 2,2,2-trifluoroethyl | benzamido |
| 1.27 | 2,2,2-trifluoroethyl | ethoxycarbonylamino |
| 1.28 | 2,4,6-trichlorophenyl | methanesulphonamido |
| 1.29 | phenyl | methanesulphonamido |
| 1.30 | 2,4,6-trichlorophenyl | benzenesulphonamido |
| 1.31 | 2,4,6-trichlorophenyl | methoxy |
| 1.32 | 2,4,6-trichlorophenyl | methylthio |
| 1.33 | phenyl | N—butyl-methane-sulphonamido |
| 1.34 | phenyl | N—butyl-acetamido |

TABLE 2

| Dye-releas. Compound | Z | Y |
|---|---|---|
| 2.01 | p-nitrophenyl | 1-pyrrolidinyl |
| 2.02 | benzyl | acetamido |
| 2.03 | benzyl | benzenesulphonamido |
| 2.04 | benzyl | benzamido |

Further examples of yellow dye-releasing compounds for use in accordance with the present invention are listed in the following Table 3. They correspond to the following structural formula VI, the symbol Z used therein having a significance as defined for the above general formulae I and II and the symbol Y standing for X—R$^5$ of the above general formulae I and II:

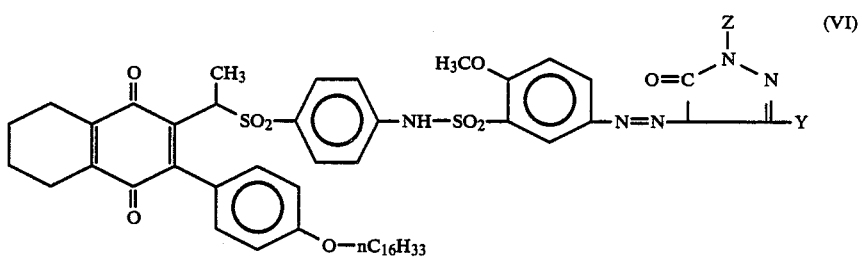

TABLE 3

| Dye-releasing Compound | Z | Y |
|---|---|---|
| 3.01 | p-methylsulphonylphenyl | acetamido |
| 3.02 | benzyl | 3-cyclohexylureido |
| 3.03 | 2,4,6-trichlorophenyl | acetamido |

A further example of a yellow dye-releasing compound for use in accordance with the present invention is the compound corresponding to the following formula, which comprises repeated dye moieties as mentioned hereinbefore:

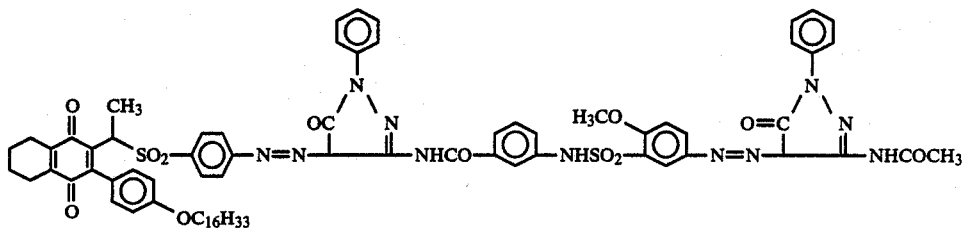

The following preparations illustrate the synthesis of dye-releasing compounds for use in accordance with the present invention. The synthesis of compound 1.01 of Table 1 is represented in the following reaction scheme and is described in Preparation 1 hereinafter.

was stirred for 1 h at 5° C. A small amount of sodium hydrogen carbonate was added to obtain a neutral reaction mixture. Subsequently, 2.4 l of water was added to the resulting mixture.

Extraction of compound 1.01 was effected with

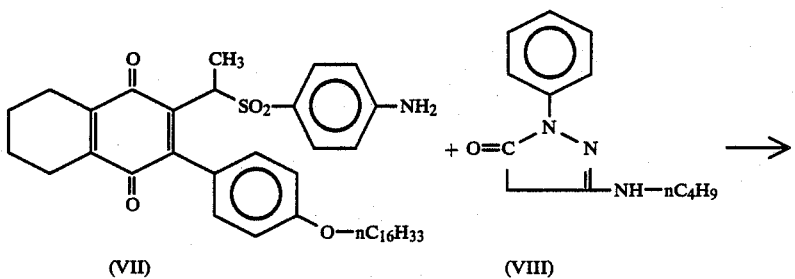

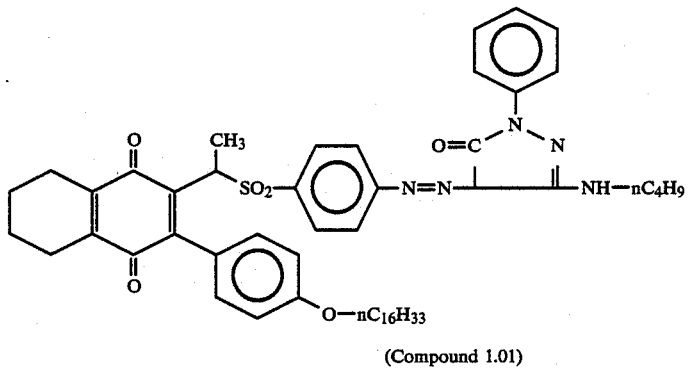

(Compound 1.01)

PREPARATION 1

Synthesis of Compound 1.01

An amount of 81 g of Compound VII, prepared as described in EP-A 0,149,260, which corresponds to the U.S. Ser. No. 06/689,133, was stirred into a mixture of 1.4 l of acetone and 39 ml of hydrochloric acid at 0° C. Diazotisation was carried out with 7.5 g of sodium nitrite dissolved in 25 ml of water. The reaction mixture was stirred for 1 h at 0° C. An amount of 27.72 g of compound VIII, prepared as described in GB 737,692 was added to the diazonium salt solution. Stirring was continued for 90 min at 0° C., whereupon 27.3 g of sodium hydrogen carbonate was added. The mixture methylene chloride. The organic layer was rinsed with water, dried with sodium sulphate, and removed by evaporation.

Yield: 91 g of product, which was purified by column chromatography with methylene chloride and ethyl acetate(98/2).

Yield: 42 g of Compound 1.01, the purity of which was checked by thin-layer chromatography (methylene chloride/ethyl acetate-98/2).

Only traces of impurities were detected.

The synthesis of Compound 1.04 of Table 1 is represented in the following reaction scheme and is described in Preparation 2.

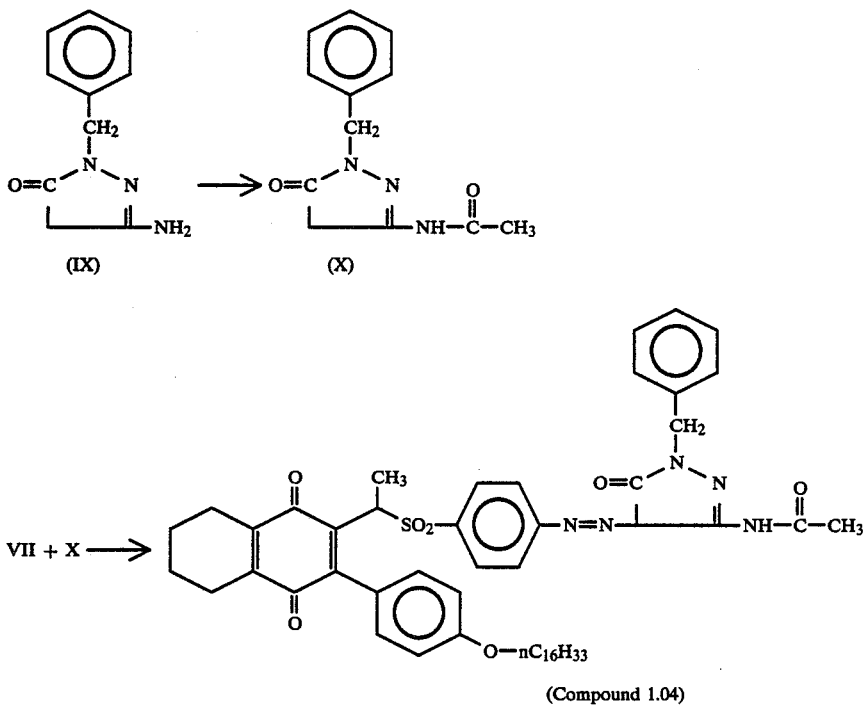

(Compound 1.04)

PREPARATION 2

Synthesis of Compound 1.04

(a) Preparation of Compound X

An amount of 133.5 ml of acetic anhydride was added in 15 min at 42° C. to a solution of 189 g of compound VI, prepared as described in U.S. Pat. No. 3,563,745, in 500 ml of acetic acid. The temperature rose to 49° C. The reaction mixture was stirred and then refluxed for 1 h. The solution was allowed to cool to 110° C., whereupon 265 ml of water was added. The mixture was brought to reflux temperature again. The crude product was obtained after evaporation. The residue was refluxed in 600 ml of benzene. The mixture was allowed to cool and the resulting precipitate was filtered with suction and rinsed with 500 ml of benzene. Compound X was dried at 100° C.

Yield: 145 g of Compound X.

(b) Preparation of Compound 1.04

An amount of 72.7 g of Compound VII was stirred into a mixture of 900 ml of acetone and 35.8 ml of hydrochloric acid at 0° C. Diazotisation was carried out with 8.36 g of sodium nitrite in 30 ml of water. The reaction mixture was stirred for 1 h at 0° C.

An amount of 25.4 g of Compound X was added to the diazonium salt solution. Stirring was continued for 1 h at 5° C. Subsequently, 25 g of sodium hydrogen carbonate was added. The resulting mixture was stirred for 30 min. An amount of 170 ml of acetic acid and 900 ml of water was added and the whole was stirred for 15 min. The precipitate formed was filtered with suction and rinsed with water. The crude product was recrystallized from a mixture of 50 ml of acetic acid and 400 ml of ethylene glycol monomethyl ether.

Yield: 74 g of Compound 1.04.

Other dye-releasing compounds for use in accordance with the present invention and corresponding to the above general formula can be prepared analogously or by techniques known in the art starting with the appropriate chemicals i.e. with the proper carrier part intermediates and the dye part intermediates that are specific for the invention.

The compounds according to each of the above general formulae I and II are believed to be new compounds and the present invention also includes such compounds per se.

The compounds according to the present invention are useful in a dye diffusion transfer process and for that purpose are used in operative association with a light-sensitive silver halide emulsion layer, preferably of the negative-working type, i.e. of the type giving a silver image in the photo-exposed areas.

For monochromic dye image production in accordance with the present invention a photosensitive silver halide emulsion element comprises a support carrying at least one alkali-permeable hydrophilic colloid silver halide emulsion layer having in operative association therewith at least one dye-releasing compound corresponding to the above general formula.

By "operative association" is meant that the release of said diffusible yellow azo-pyrazolone dye from the dye-releasing compound can proceed in dependence on and in function of the development of the silver halide emulsion layer. The dye-releasing compound need not be present in the silver halide emulsion layer itself but may be contained in another layer that is in water-permeable relationship therewith.

According to an embodiment for the production of multicolour images the present invention provides a photosensitive element that comprises a support carrying (1) a red-sensitive silver halide emulsion layer having operatively associated therewith a dye-releasing compound that initially is non-diffusing in an alkali-permeable colloid medium and from which, inversely proportional to the development of the image-wise exposed silver halide by a silver halide developing agent in alkaline conditions and a redox-reaction, a cyan dye is split off in diffusible state, (2) a green-sensitive silver halide emulsion layer having operatively associated therewith a dye-releasing compound that initially is non-diffusing in an alkali-permeable colloid medium and from which, inversely proportional to the development of the image-wise exposed silver halide by a silver halide developing agent in alkaline conditions and a redox-reaction, a magenta dye is split off in diffusible state, and (3) a blue-sensitive silver halide emulsion layer having operatively associated therewith at least one dye-releasing compound corresponding to one of the above general formulae I and II, which initially is non-diffusing in an alkali-permeable colloid medium and from which, inversely proportional to the development of the image-wise exposed silver halide by a silver halide developing agent in alkaline conditions and a redox-reaction, a yellow dye is split off in diffusible state.

In the IHR mode the colour diffusion transfer process in accordance with the invention is carried out preferably in conjunction with a mixture of reducing agents, at least one of which is a compound called electron donor (ED-compound) and at least one of which is a compound called electron-transfer agent (ETA-compound).

The ED-compound is preferably non-diffusing, e.g. it preferably carries a ballasting group, so that it remains in the layer(s), in which it has to transfer an electron to the quinone-type compound.

Preferably, a said non-diffusing ED-compound is incorporated into each silver halide emulsion layer that contains a non-diffusing IHR-quinone-type compound. Examples of suitable ED-compounds are ascorbyl palmitate and 2,5-bis(1',1',3',3'-tetramethylbutyl)hydroquinone. Other ED-compouds have been disclosed in U.S. Pat. No. 4,139,379 and in published DE-A No. 2,947,425. Instead of an ED-compound an electron-donor precursor compound (EDP-compound) can be used in the photosensitive element as described e.g. in published DE-A No. 2,809,716 and in U.S. Pat. No. 4,278,750. Particularly useful ED-precursor compounds for combination with IHR compounds corresponding to the above general formulae I and II have been disclosed in EP-A No. 0,124,915 and in published DE-A No. 3,006,268. The compounds disclosed in the publication correspond to the following general formula:

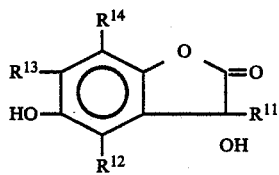

wherein:
R$^{11}$ represents a carbocyclic or heterocyclic aromatic ring,
each of R$^{12}$, R$^{13}$, and R$^{14}$ (same or different) represents hydrogen, alkyl, alkenyl, aryl, alkoxy, alkylthio, amino, or
R$^{13}$ and R$^{14}$ together represent an adjacent ring e.g. carbocyclic ring,
at least one of R$^{11}$, R$^{12}$, R$^{13}$, and R$^{14}$ representing a ballast group having from 10 to 22 carbon atoms.

The ETA-compound is preferably a developing agent, which is incorporated in mobile form, e.g. into (a) hydrophilic colloid layer(s) adjacent to one or more silver halide emulsion layers, or is applied as an ingredient of the processing liquid used for the dye diffusion transfer.

Typically useful ETA-compounds include hydroquinone compounds, aminophenol compounds, catechol compounds, phenylenediamine compounds, and 3-pyrazolidinone compounds e.g. 1-aryl-3-pyrazolidinone as described, e.g., in U.S. Pat. No. 4,139,379.

A combination of different ETA-compounds such as those disclosed in U.S. Pat. No. 3,039,869 can be employed. They can be contained in the liquid processing composition or can be contained at least partially in any layer or layers of the photosensitive element e.g. the silver halide emulsion layer(s), interlayer(s), or in the image-receiving layer. The selection of the specifically used ETA-compound(s) is, of course, determined by the particular electron donor and dye-releasing compound used in the process and the processing conditions for the particular photosensitive element.

The concentration of ED-compound or ED-precursor compound in the photosensitive material may vary within a broad range but is, e.g., in the molar range of 1:1 to 8:1 with respect to the dye-releasing compound. The ETA-compound may be present in the alkaline aqueous liquid used in the development step, but is used preferably in diffusible form in a non-sensitive hydrophilic colloid layer adjacent to the silver halide emulsion layer(s).

Migration of unoxidized developing agent, e.g. acting as ETA-compound, proceeds non-image-wise and has an adverse effect on colour rendition if excess unoxidized developing agent remains in the photoexposed areas of a negative-working emulsion layer. Therefore, according to a preferred embodiment of the present invention a silver halide solvent, e.g. thiosulphate, is used to mobilize unexposed silver halide in complexed form for helping to neutralize (i.e. oxidize by physical development) such excess unoxidized developing agent in the photoexposed areas where unaffected developing agent (ETA-compound) should no longer be available for entering into reaction with the dye-releasing compound directly or through the applied ED-compound. The use of silver halide solvents for that purpose has been described in the published EP-A No. 0049002.

For better colour rendition it is advantageous to intercept oxidized ETA-compound and prevent it from migrating to adjacent imaging layers where it could cause undesired oxidation of ED-compound. So-called scavengers can be used for such interception. They can be incorporated in non-diffusible state into the photosensitive element, e.g. in interlayers between the imaging layers. Suitable scavengers for that purpose have been described in e.g. U.S. Pat. No. 4,205,987 and EP-A No. 0,029,546.

The dye-releasing compounds and optionally ED or ETA-compounds can be incorporated into the photosensitive element by addition thereof to the coating composition(s) of its layer(s) according to the usual methods known, e.g., for the incorporation of colour couplers into photosensitive silver halide emulsion elements.

The amount of dye-releasing compound coated per sq.m may vary within wide limits and depends on the maximum colour density desired.

The photosensitive element may contain (a) filter layer(s) to improve the correct spectral exposure of the differently spectrally sensitive silver halide emulsion layers, e.g. a yellow (colloidal silver) layer below the only blue-sensitive silver halide emulsion layer and a magenta filter layer below the green-sensitive silver halide emulsion layer for absorbing green light, to which the underlying red-sensitized silver halide emulsion layer may be sensitive to some extent. A suitable magenta dye for that purpose is Violet Quindo RV 6911-Colour index, C.I. 46500 Pigment Violet 19.

The support of the photosensitive elements of this invention may be of any material as long as it does not deleteriously affect the photographic properties of the elements and is dimensionally stable. Typical flexible sheet materials for forming the support are paper, e.g. single-side in twin-side Alpha-olefin-polymer-coated paper such as polyethylene-coated paper and polypropylene-coated paper. Other flexible sheet support materials are e.g. cellulose nitrate film, cellulose acetate film, poly(vinyl acetal) film, polystyrene film, poly(ethylene terephthalate) film, polycarbonate film, and related films or resinous materials. The support usually has a thickness of approximately 0.05 to 0.15 mm.

The image-receiving layer can form part of a separate image-receiving element or form an integral part of the photosensitive element.

When after the processing of the photosensitive element the image-receiving layer is to remain associated with the silver halide emulsion layer(s) of the photosensitive element, an alkali-permeable light-shielding layer, e.g. a layer containing white pigment particles is applied customarily between the image-receiving layer and the silver halide emulsion layer(s).

Any material can be employed as image-receiving layer in dye diffusion transfer photography, provided it performs the desired function of mordanting or otherwise fixing the diffused dye(s). The selection of the particular material to be used is, of course, determined by the nature of the dye(s) to be mordanted. If acid dyes are to be mordanted, the image-receiving layer can be composed of or contain basic polymeric mordants such as polymers of amino-quanidine derivatives of vinyl methyl ketone such as described in U.S. Pat. No. 2,882,156 of Louis M. Minsk, issued Apr. 14, 1959, and basic polymeric mordants and derivatives, e.g. poly-4-vinylpyridine, the metho-p-toluene sulphonate of 2-vinylpyridine and similar compounds described in U.S. Pat. No. 2,484,430 of Robert H. Sprague and Leslie G. Brooker, issued Oct. 11, 1949, and the compounds described in the published DE-A No. 2,200,063 filed Jan. 11, 1971 by Agfa-Gevaert A. G. Suitable mordanting binders include, e.g., guanylhydrazone derivatives of acyl styrene polymers, as described, e.g., in published DE-A No. 2,009,498 filed Feb. 28, 1970 by Agfa-Gevaert A. G. In general, however, other binders, e.g. gelatin, are added to the last-mentioned mordanting binders. Effective mordanting compositions are long-chain quaternary ammonium or phosphonium compounds or ternary sulphonium compounds, e.g. those described in U.S. Pat. No. 3,271,147 of Walter M. Bush and 3,271,148 of Keith E. Whitmore, both issued Sept. 6, 1966, and cetyltrimethyl-ammonium bromide. Certain metal salts and their hydroxides that form sparingly soluble compounds with the acid dyes can also be used. The dye mordants are dispersed in one of the usual hydrophilic binders for the image-receiving layer, e.g. in gelatin, polyvinylpyrrolidone, or partly or completely hydrolysed cellulose esters.

Good results are obtained e.g. when the image-receiving layer, which preferably is permeable to alkaline solution, is transparent and has a thickness of approximately 4 to 10 $\mu$m. Of course, the thickness can be modified depending upon the results aimed at. The image-receiving layer can also contain other additives such as ultraviolet-absorbing substances to protect the mordanted dye images from fading, brightening agents e.g. stilbenes, coumarins, triazines, oxazols, or dye stabilizers such as the chromanols and alkyl-phenols.

Lowering of the pH-value in the dye-image-receiving element usually leads to increased stability of the transferred image. In general, the pH of the image layer can within a short time after imbibition be lowered from about 14–13 to 11 but preferably to 7–5. For instance, polymeric acids as disclosed in U.S. Pat. No. 3,362,819 of Edwin H. Land, issued Jan. 9, 1968, or solid acids or metal salts, e.g. zinc acetate, zinc sulphate, magnesium acetate, etc., as disclosed in U.S. Pat. No. 2,584,030 of Edwin H. Land, issued Jan. 29, 1952, can be employed successfully for that purpose. Such pH-lowering substances reduce the pH of the dye-image-receiving element after development to terminate development and substantially reduce further dye transfer and thus stabilize the dye image.

The acid for lowering the pH can be incorporated into a layer, which can be coated with an inert timing or spacer layer that times or controls the pH-reduction proportionally to the rate, at which alkali diffuses through this inert spacer layer. Examples of such timing layers include gelatin, polyvinyl alcohol, or any of the colloids disclosed in U.S. Pat. No. 3,455,686 of Leonard C. Farney, Howard G. Rogers and Richard W. Young, issued July 15, 1969. The timing layer can be effective in evening out the various reaction rates over a wide range of temperatures. For instance, premature pH-reduction is prevented, when imbibition is effected at temperatures above room temperature, e.g. at 35° to 37° C. The thickness of the timing layer is usually comprised between approximately 2.5 $\mu$m and 18 $\mu$m. Especially good results are obtained when the timing layer comprises a hydrolysable polymer or a mixture of such polymers, which are hydrolysed slowly by the processing liquid. Examples of such hydrolysable polymers are e.g. polyvinyl acetate, polyamides, or cellulose esters.

An alkaline aqueous processing liquid employed in the production of dye images according to the present invention may be a conventional aqueous solution of an alkaline substance e.g. sodium hydroxide, sodium carbonate or an amine such as diethylamine. Preferably this alkaline aqueous processing liquid has a pH above 11.

According to one embodiment the alkaline aqueous processing liquid contains the diffusible developing agent that effects the reduction of the silver halide, e.g. ascorbic acid or a 3-pyrazolidinone developing agent such as 1-phenyl-4-methyl-3-pyrazolidinone.

The alkaline aqueous processing liquid used in accordance with the process of the invention may also contain a desensitizing agent such as methylene blue, a nitro-substituted heterocyclic compound, or a 4,4'-bis-pyridinium salt, to ensure that the photosensitive element is not further exposed after its removal from the camera for processing.

For in-camera-processing the alkaline aqueous processing liquid preferably also contains a viscosity-increasing compound such as a high-molecular-weight polymer, e.g. a water-soluble ether inert to alkaline solutions such as hydroxyethylcellulose or alkali metal salts of carboxymethylcellulose e.g. sodium carboxymethylcellulose. A concentration of viscosity-increasing compound of approximately 1 to 5% by weight of the alkaline aqueous processing liquid is preferred. It imparts a viscosity of about 100 mPa.s to about 200,000 mPa.s.

Although the common purpose in known dye-diffusion transfer systems is to produce dye images in a receiving layer or sheet by means of dye(s) released from the photosensitive element, a residual image of dye-releasing compound in the photosensitive element may be of practical interest for forming a so-called "retained image". This terminology is used, e.g. in Research Disclosure (No. 17362) of September 1978 and a dye-diffusion process relating thereto has been exemplified in Research Disclosure (No. 22711) of March 1983.

Processing can proceed in a tray developing unit as is contained, e.g., in an ordinary silver complex diffusion transfer (DTR) apparatus, in which contact between the image-wise exposed photosensitive element and a separate dye image-receiving element is effected after sufficient absorption of processing liquid by these elements has taken place. A suitable apparatus for this purpose is the COPYPROOF CP 42 (trade name) DTR-developing apparatus. COPYPROOF is a trade name of Agfa-Gevaert, Antwerp/Leverkusen.

In the case that the photosensitive layer(s) and the image-receiving layer are integrated in one single element, the alkaline aqueous processing liquid can be applied from at least one rupturable container, which may itself form part of said element, or by spraying.

Examples of rupturable containers that can be employed are those disclosed in U.S. Pat. Nos. 2,543,181 of Edwin H. Land, issued Feb. 27, 1951, 2,643,886 of Ulrich L. di Ghilini, issued June 30, 1953, 2,653,732 of Edwin H. Land, issued Sept. 29, 1953, 2,723,051 of William J. McCune Jr., issued Nov. 8, 1955, 3,056,492 and 3,056,491, both of John E. Campbell, issued Oct. 2, 1962, and 3,152,515 of Edwin H. Land, issued Oct. 13, 1964. In general, such containers comprise a rectangular sheet of fluid- and air-impervious material folded longitudinally upon itself to form two walls that are sealed to one another along their longitudinal and end margins to form a cavity in which processing liquid is contained.

The following examples illustrate the present invention. The amounts given are per square meter.

EXAMPLES

Preparation of a receptor element

The following composition was applied to a corona-treated polyethylene-coated paper support:

| | |
|---|---|
| (1) gelatin | 2.5 g |
| polymeric mordanting agent prepared from 4,4'-diphenylmethane diisocyanate and N—ethyldiethanolamine quaternized with epichlorohydrin as described in Example 1 of US-A 4,186,014 | 2.5 g |
| (2) protective gelatin layer | 0.8 g |

Preparation of photosensitive elements

A strip of subbed polyethylene terephthalate support having a thickness of 0.1 mm was coated with the following layers in the given order:

| | |
|---|---|
| (1) a silver halide emulsion layer containing: | |
| gelatin | 1.8 g |
| AgCl expressed as AgNO$_3$ | 0.5 g |
| yellow dye-releasing compound 1.01 of Table 1 | 0.333 g |
| ED compound: 2,5-bis(1',1',3',3'-tetramethyl-butyl)-hydroquinone | 0.09 g |
| (2) protective layer containing: | |
| gelatin | 6 g |
| 1-phenyl-4-methyl-pyrazolidin-3-one | 0.12 g |
| citric acid up to a pH of 4.5 in both layers | 0.06 g |

A number of identical strips of photosensitive element were made, except that each of them contained instead of the above-mentioned compound 1.01 an equal molar concentration of another yellow dye-releasing compound as listed in Table 4 hereinafter.

Each of the strips containing a different dye-releasing compound was cut in 2 pieces.

The silver halide of the first series of cut strip pieces was removed by fixing, whereupon the absorption maximum of the dye-releasing compound ($\lambda_{fix}$) contained in non-diffusing state in each fixed silverless strip was determined.

The second series of the strip pieces were exposed image-wise and together with a receptor element as described above fed through a COPYPROOF (registered trade name of Agfa-Gevaert N. V. Belgium) CP 42 diffusion transfer processing apparatus containing in its tray an aqueous alkaline processing liquid comprising per liter:

| | |
|---|---|
| sodium hydroxide | 25 g |
| sodium orthophosphate | 25 g |
| cyclohexane dimethanol | 80 g |
| sodium bromide | 2 g |
| sodium thiosulphate | 2 g |
| water to make | 1 liter. |

The photosensitive elements were stripped from the receptor elements. Next, the absorption maximum ($\lambda_D$) of the dyes tranferred to the receptor elements by diffusion and mordanted therein was measured.

A comparison of the absorption maxima ($\lambda_{fix}$) listed in Table 4 of the dye-releasing compounds of the invention with those of the known dye-releasing compounds A, B, and C shows the advantageous hypsochromic shift of the first in respect of the latter. The results gathered in Table 4 also demonstrate that the absorption maxima ($\lambda_{fix}$) of the dye-releasing compounds of the invention are below 400 nm and often below 390 nm. Compounds 1.04, 1.11, 1.17, 1.18, 1.25, and 1.31 have an absorption maximum ($\lambda_{fix}$) of 382 nm and even lower. As a consequence, in contrast with known dye-releasing compounds, the dye-releasing compounds of the invention do not substantially reduce the speed of the blue-sensitive layer incorporating them. Table 4 also shows that the absorption maxima ($\lambda_D$) of the dyes tranferred to the receptor elements and mordanted therein lie well into the blue region of the spectrum, as is desired for such dyes. Moreover, the stability to heat, light, and moisture as well as the dark-fading stability of the azopyrazolone dyes obtained appeared to be good.

TABLE 4

| Dye-releasing compound | $\lambda_{fix}$* | $\lambda_D$** |
|---|---|---|
| Comparison A | 410 | 449 |
| Comparison B | 404 | 425 |
| Comparison C | 413 | 446 |
| 1.01 | 390 | 426 |
| 1.04 | 381 | 442 |
| 1.05 | 389 | 422 |
| 1.07 | 390 | 412 |
| 1.11 | ≦380 | 424 |

TABLE 4-continued

| Dye-releasing compound | $\lambda_{fix}$* | $\lambda_D$** |
|---|---|---|
| 1.12 | 385 | 432 |
| 1.13 | 386 | 404 |
| 1.14 | 384 | 416 |
| 1.16 | 390 | 434 |
| 1.17 | <380 | 432 |
| 1.18 | <380 | 426 |
| 1.19 | 388 | 436 |
| 1.23 | 388 | 436 |
| 1.23 | 388 | 436 |
| 1.25 | 382 | 422 |
| 1.27 | 386 | 429 |
| 1.28 | 389 | 416 |
| 1.30 | 390 | 404 |
| 1.31 | <380 | 421 |
| 2.03 | 388 | 416 |

*$\lambda_{fix}$ stands for the absorption maximum of the dye-releasing compound in the photosensitive element.
**$\lambda_D$ stands for the absorption maximum of the dye mordanted after diffusion-transfer.

Compound A is a comparison compound known from U.S. Pat. No. 4,477,554 and corresponding to the following formula:

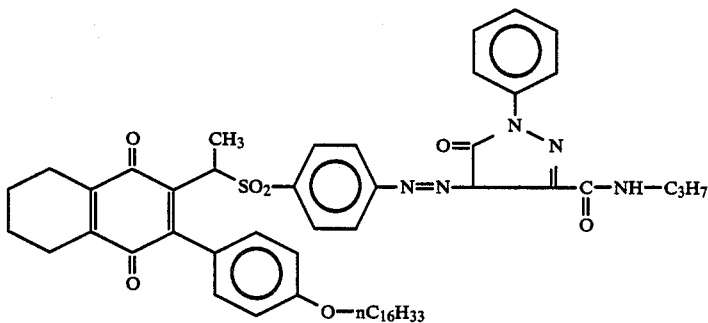

Compound B is a comparison compound prepared according to the procedure described in U.S. Pat. No. 4,371,604 and corresponding to the following formula:

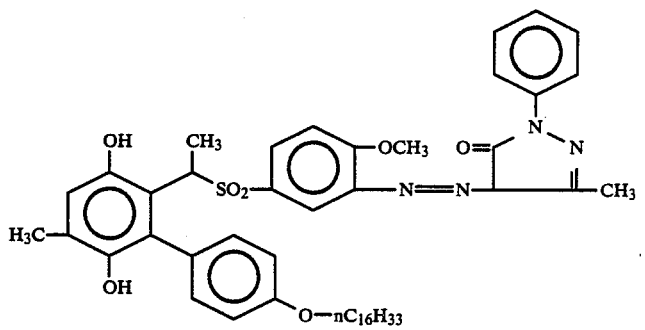

Compound C is a comparison compound prepared in a manner analogous to the preparation of Compound 1Y in U.S. Pat. No. 4,477,554 and corresponding to the following formula:

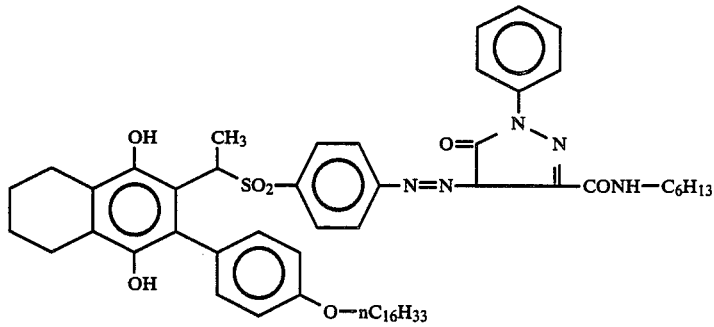

The stability to light of the mordanted dyes was tested with a XENOTEST (trade name) type 50 apparatus of Hanau Quartzlampen GmbH, Hanau, W. Germany. The receptor strips containing the mordanted dyes were exposed for 8 h to white light and ultra-violet radiation. The % loss in maximum density of mordanted dye is given in Table 5.

TABLE 5

| Mordanted dye obtained from dye-releasing compound | % loss in maximum density |
|---|---|
| Comparison A | −14 |
| Comparison B | −24 |
| Comparison C | −20 |
| Compound 1.01 | −7 |
| Compound 1.02 | −6 |

TABLE 5-continued

| Mordanted dye obtained from dye-releasing compound | % loss in maximum density |
|---|---|
| Compound 1.03 | −9 |
| Compound 1.04 | −8 |
| Compound 1.05 | −13 |
| Compound 1.10 | −9 |
| Compound 1.11 | −4 |
| Compound 1.12 | −9 |
| Compound 1.14 | −10 |
| Compound 1.15 | −8 |
| Compound 1.16 | −11 |
| Compound 1.19 | −7 |
| Compound 1.23 | −8 |
| Compound 1.25 | −9 |
| Compound 2.02 | −11 |
| Compound 2.03 | −9 |

We claim:

1. Photosensitive element incorporating in operative association with at least one alkali-permeable silver halide hydrophilic colloid emulsion layer at least one hydroquinone-type or quinone-type redox-controlled dye-releasing compound in ballasted non-diffusing state that can split off image-wise a diffusible yellow azo-pyrazolone dye as a function of development of said silver halide emulsion layer and of a redox reaction, wherein said dye-releasing compound corresponds to one of the following general formulae I and II:

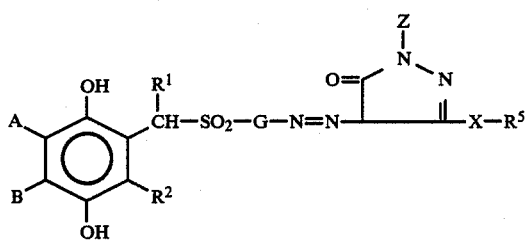

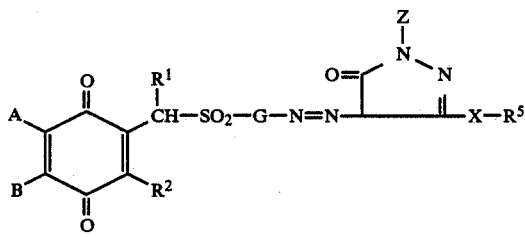

wherein:
each of A and B represents:
  a monoatomic group or a polyatomic group,
  or A and B together represent the atoms needed to complete a carbocyclic ring, which may be saturated or unsaturated, each of $R^1$ and $R^2$ (the same or different) is a member selected from the group consisting of hydrogen, an alkyl group and an aromatic group, at least one of the substituents $R^1$ and $R^2$ representing or including a ballasting group of sufficient size to render said dye-releasing compound non-diffusing in an alkali-permeable hydrophilic colloid layer under wet alkaline conditions, G represents a bivalent organic group (unsubstituted or substituted) containing at least one homocyclic or heterocyclic aromatic nucleus, Z represents a member selected from the group consisting of an alkyl group, an aryl group, an aralkyl group, a hetaryl group, and a heterocyclyl group, which may be saturated or unsaturated, $R^5$ represents a member selected from the group consisting of an alkyl group, an aryl group, hetaryl group, an acyl group, an alkylsulphonyl group, an unsubstituted benzenesulphonyl group, a p-acetamidobenzenesulphonyl group, $R^7R^8NCO-$, $R^7R^8NSO_2-$, $R^7OCO-$, and $R^7OSO_2-$, $R^7$ and $R^8$ being identical or different and each of them being a member selected from the group consisting of hydrogen, an alkyl group, an aryl group, a hetaryl group, or $R^7$ and $R^8$ together constituting the ring members completing a heterocyclic nucleus, X is a bivalent mono- or polyatomic group, the atom of which that links said group with the pyrazolone nucleus having at least one free electron pair.

2. A photosensitive element according to claim 1, wherein said dye-releasing compound is a reducible quinone-type IHR-compound.

3. A photosensitive element according to claim 1, wherein said dye-releasing compound carries on the 1-position of its pyrazolone nucleus a member selected from the group consisting of an aryl group and an aralkyl group and on the 3-position of its pyrazolone nucleus, a member selected from the group consisting of a carboxylic acid amide group, an alkylureido group, a cycloalkylureido group, and an arylureido group.

4. A photosensitive element according to claim 3, wherein said dye-releasing compound at the 1-position of its pyrazolone nucleus carries benzyl and at the 3-position of the pyrazolone nucleus a member selected from the group consisting of acetamido, 3-cyclohexylureido, and 3-butylureido.

5. A photosensitive element according to claim 3, wherein said dye-releasing compound at the 1-position of its pyrazolone nucleus carries phenyl and at the 3-position of the pyrazolone nucleus 3-phenylureido.

6. A photosensitive element according to claim 3, wherein said dye-releasing compound at the 1-position of its pyrazolone nucleus carries p-methylsulphonylphenyl and at the 3-position of the pyrazolone nucleus acetamido.

* * * * *